Patented June 21, 1938

2,121,690

UNITED STATES PATENT OFFICE 2,121,690

RESINOUS COATING COMPOSITIONS

Donald Edwards Edgar, Philadelphia, Pa., assignor to E. I. du Pont de Nemours & Company, Wilmington, Del., a corporation of Delaware No Drawing. Application November 5, 1935, Serial No. 48,447

3 Claims. (Cl. 91—70)

This invention relates to coating compositions and more particularly to improved resinous compositions combined with China-wood and similar oils.

Drying oils such as China-wood oil are used extensively in coating compositions, frequently in combination with other materials. China-wood oil is used also, for example, to modify alkyd or polyhydric alcohol-polybasic organic acid resins to impart to such resins certain desirable properties possessed by the China-wood oil. Coating compositions prepared from such oil modified alkyd type resins when used to prepare enamel-like finishes are usually subjected to a baking treatment at elevated temperatures in order to produce a thoroughly hardened film. It has been found, however, that China-wood oil composition finishes as, for example, China-wood oil modified alkyd resin coatings produce a frosted or wrinkled surface in the finish on being dried and baked unless the China-wood oil has previously been subjected to a heat treatment to overcome this tendency. This heat treatment is known as a "curing" treatment and the oil so treated as a "cured" oil. Various treatments of the oil to minimize or eliminate the tendency of China-wood oil to frost or wrinkle have been suggested but the results have not been satisfactorily consistent to eliminate the defect with any degree of practical assurance. The heat treatment of China-wood oil, as well as other treatments suggested, to "cure" the oil also add to the cost of the oil and to the product in which the oil is to be used. In using China-wood oil or China-wood oil modified alkyd resins in coating compositions there is always present the inherent tendency for the coating to develop a "frosted" or wrinkled surface even though the oil may have been subjected to a preliminary treatment to "cure" it. This defect often develops into what is known in the finishes industry as "crowsfoot" which results in a very unsatisfactory finished surface.

This invention has as an object the preparation of coating compositions which contain polyhydric alcohol-polybasic acid resins combined with China-wood and similar oils but which produce films substantially free from the frosting, wrinkling, checking, etc., which takes place in the films of such oils. A further object is the preparation of coating compositions which will produce films which are hard and tough and which can be dried and baked at relatively low temperatures and for relatively short periods of time as compared with similar compositions of the present state of the art. A further object is the preparation of coating compositions which will produce films that will have excellent adhesion to sanded steel or its equivalent. A still further object is the preparation of coating compositions which can be applied in extremely heavy (or thick) coats to produce hard, tough and durable films. Other objects will appear hereinafter.

These objects are accomplished according to the present invention by preparing the China-wood oil or China-wood oil acid modified polyhydric alcohol-polybasic acid resin in the presence of an amount of polyhydric alcohol in excess of that required as the theoretical quantity necessary for the reaction and then combining the alkyd resin in solution in organic solvent with a suspension of urea-formaldehyde resin in organic solvent. Conveniently I add to the alkyd resin a suspension of the urea-formaldehyde resin in an organic liquid in which the alkyd resin is soluble. If desired the alkyd resin may first be dissolved in the organic solvent and the urea-formaldehyde reaction product added to the solution of the alkyd resin. Although the use of a suspension rather than a solution of urea-formaldehyde resin is not a theoretical requirement, it is a fact that this resin is generally insoluble in organic liquids and is but soluble only to the extent of about 10% in water. However, when the urea-formaldehyde resin is combined, usually with heat and agitation, with the polyhydric alcohol-polybasic acid resin in the presence of organic solvent as described above there is obtained a homogeneous blend which, for all practical purposes and as far as visual conception is concerned, contains the urea-formaldehyde resin in solution.

The alkyd resins with which the present invention is concerned are polyhydric alcohols having some of their hydroxyl groups esterified with polybasic acid radicals and some esterified with the acid radicals of oil acids derived from China-wood oil and similar oils subject to frosting in the film. These frosting oil modified resins may be made by reacting simultaneously with heat treatment polyhydric alcohol, polybasic acid and the acids derived from the oil. Or the polyhydric alcohol may be first reacted in the presence of an alcoholysis catalyst with the oil itself and the resulting polyhydric alcohol partially acylated with the oil acid reacted with polybasic acid until resinification takes place.

The new resinous combinations may be illustrated by the following examples in which the parts are by weight, but it is to be understood, however, that the invention is not limited thereto except as indicated in the appended claims.

*Example I*

China-wood oil 488 parts, glycerol 96 parts, and 0.5 part of sodium hydroxide were heated with agitation to a temperature of 220–240° C. and the mixture maintained in this temperature range until a sample removed therefrom is clear and homogeneous and soluble in approximately 2 parts of methyl alcohol. 493 grams phthalic anhydride and 166 grams of glycerol were then added and the temperature again raised to 220–225° C. and heating continued with agitation at this temperature until the material possessed an acid number of approximately 45.

One part of the resin thus prepared containing 45% of combined China-wood oil was added to a suspension of the reaction product of urea and formaldehyde in two parts ethyl ether of ethylene glycol and the mixture heated with agitation at approximately 100° C. until substantially all of the solid material disappeared. The material was allowed to cool and then strained or filtered to remove any extraneous material. This resinous combination forms the basis for the preparation of the pigmented coating compositions or enamels described later.

The reaction product of urea and formaldehyde may be made according to any procedure well known in the art although it is preferred to use the material made according to the procedure described in co-pending application, Serial Number 34,300, filed August 1, 1935.

*Example II*

A 35% China-wood oil modified polyhydric alcohol-polybasic acid resin was prepared by reacting the following ingredients:

| | Parts by weight |
|---|---|
| China wood oil | 35 |
| Glycerol | 7 |
| Litharge | 0.03 | in the manner described under Example I. One part by weight of the resin was likewise combined with two parts by weight of the reaction product of urea and formaldehyde with the exception that the ethyl ether of ethylene glycol of the previous example was replaced by butyl alcohol.

*Example III*

A 55% China-wood oil modified resin was prepared by heating the following ingredients:

| | Parts by weight |
|---|---|
| China-wood oil | 55 |
| Glycerine | 5 |
| Sodium hydroxide | 0.05 | according to the directions given in Example I. After a homogeneous mass was obtained 3.48 parts by weight of phthalic anhydride and 7.5 parts by weight of glycerol were added to complete the resinification. The resin and urea-formaldehyde were then combined as described in Example I.

China-wood oil has been referred to specifically in the foregoing examples because it is the most representative and widely used of the drying oils subject to frosting in the film. The present invention, however, is likewise advantageously practiced with other wood oils and with all drying oils which yield films which wrinkle upon drying. Thus, the resin in the examples of coating compositions appearing below may be replaced with oiticica oil, as indicated in the following example, for the production of films which are substantially free from frosting as compared to the films from compositions formulated with the oil itself or with alkyd resin modified with this oil.

*Example IV*

40.7 parts of oiticica oil and 8.0 parts of glycerine were heated with 0.04 part of sodium hydroxide to a temperature of 220–240° C. and held at this temperature until a sample was clear and homogeneous and soluble in 2 parts of methyl alcohol. 41.1 parts of phthalic anhydride and 20 parts of glycerine were added. The temperature was raised to 220–225° C. and held at that point until a sample on analysis showed an acid number of 50–60.

One part of the above resin was dissolved in two parts of the monoethyl ether of ethylene glycol and one part of reaction product of urea and formaldehyde was added to this solution and the temperature was raised to 90–100° C. and maintained until substantially all of the solid material was dissolved. Undissolved material may be removed by filtration, centrifuging or other suitable manner.

The following are examples of enamels formulated with the resinous compositions described above:

*Example V*

| | Parts |
|---|---|
| Carbon black | 2.6 |
| Solid resin of Example I | 37.8 |
| Volatile solvent | 59.6 |
| | 100.0 |

*Example VI*

| | Parts |
|---|---|
| Toluidine toner | 8.2 |
| Solid resin of Example I | 33.2 |
| Volatile solvent | 58.6 |
| | 100.0 |

*Example VII*

| | Parts |
|---|---|
| Titanium oxide | 25.3 |
| Solid resin of Example I | 31.6 |
| Volatile solvent | 43.1 |
| | 100.0 |

The pigment in each case was dispersed in the resinous vehicle by any means well known to those skilled in the art as by ball or pebble mill grinding, roller mill grinding, etc.

The enamels thus prepared may be applied to suitable surfaces by any of the well known means as for example spraying, brushing, etc. If desired the coating may be allowed to air dry in which instance the film will be tack-free in approximately four hours and will have dried to a hard film in from 24 hours to several days. The coating is preferably dried by subjecting it to a short period of air drying if desired and then baking at an elevated temperature of for example 200° F. for a period of 30 minutes after which treatment a hard, tough and durable film is formed. The coating may be baked at a lower temperature e. g. 140–150° F. with a corresponding increase in time or at a higher temperature e. g. 300° F. with a corresponding decrease in time.

In the examples of the pigmented compositions or enamels the resinous combinations of China-wood oil modified alkyd resin and the reaction product of urea and formaldehyde are noted as being the sole constituent of the vehicle. Combinations of the various percentage China-wood oil or oil acids modified alkyd resins may be used, the choice depending on the properties desired in the finished composition.

The alkyd resin may be modified with China-wood oil or oil acids to the extent of from 30 to 60% although the preferred range lies between 35 and 55%.

The pigmented compositions are not limited to the use of any special pigments since any pigment which will not react deleteriously with the resin vehicle may be used. Enamels in various colors and shades may be produced by blending pigments according to procedures well known in the art.

The volatile solvents used in the enamels may be such as are commonly used in preparations of this type.

To disperse the reaction product of urea and formaldehyde in combining it with the fatty oil or fatty oil acid modified polyhydric alcohol-polybasic acid resin other liquids than those described in the examples may be used as for example the methyl ether of ethylene glycol, ethyl alcohol, amyl alcohol, butyl alcohol, isobutyl alcohol and similar materials.

Although the amount of glycerol in excess of that theoretically required for complete esterification of the acid reactants in the preparation of polyhydric alcohol-polybasic acid resins of the examples is between approximately 10% and 22% this may conveniently vary between 5% and 30%, amounts less than 5% not yielding the optimum results and amounts over 30% being in excess of the maximum required. Glycerol is noted in the examples as the polyhydric alcohol used in the preparation of the alkyd resin. Other polyhydric alcohols as ethylene glycol, propylene glycol, diethylene and triethylene glycol may also be used, the same or a different polyhydric alcohol being used for the excess quantity over that necessary for the theoretical reaction. The choice of the polyhydric alcohol will depend to a large extent on the type of alkyd resin it is desired to combine with the reaction product of urea and formaldehyde and will be apparent to those skilled in the art of preparing such resins. Polybasic acids other than phthalic, such as succinic, maleic, etc., known to be useful for making alkyd resins may likewise be used in the practice of the present invention.

In the examples the ratio of the polyhydric alcohol-polybasic acid resin oil modified resin to the reaction product of urea and formaldehyde for the resinous combination is given as 1:1. This ratio may vary over rather wide limits although it is preferred not to have the ratio greater than 2:1 where the compositions are to be used for producing coatings for decorative and protective purposes.

The products of the invention are especially adapted for use as decorative and protective coatings for various types of rigid or semi-rigid surfaces such as wood, metal, etc. The pigmented compositions may be used to produce enamel-like finishes on various metal articles where a smooth, hard, tough and durable finish is desired or necessary.

The procedure described herein makes possible the production of enamel-like compositions containing those fatty oils or oil acids subject to frosting or wrinkling in the film such as China-wood oil or China-wood oil fatty acids which will form hard, tough and durable films free from "frost", wrinkles, or "crowsfoot". The enamel-like compositions such as those indicated by the examples have excellent adhesion when applied to such materials as sanded steel and suitably dried. A still further advantage is the provision of compositions which can be applied to a surface to produce a film in extremely heavy applications with a resulting film which is smooth and free from surface imperfections. The present invention also presents as an additional advantage the provision of enamel-like compositions which can be baked to hard and tough films at temperatures considerably lower than is practical with resinous compositions of the present art. The economic advantages of the use of lower temperatures and shorter periods of baking are obvious.

As many apparently widely different embodiments of this invention may be made without departing from the spirit and scope thereof, it is to be understood that I do not limit myself to the specific embodiments thereof except as defined in the appended claims.

I claim:

1. An article of manufacture coated with a non-frosted and unwrinkled film of a baked resinous composition comprising urea-formaldehyde reaction product and substantial amount of polyhydric alcohol-polybasic acid resin modified with a substantial quantity of drying oil subject to frosting and wrinkling in the film which normally causes frosting and wrinkling in the films of such resins, said resin containing polyhydric alcohol in combined form in excess of from 5% to 30% of that required for complete esterification of the acid reactants.

2. The article set forth in claim 1 in which said film is pigmented.

3. The article set forth in claim 1 in which said drying oil is China-wood oil, the polyhydric alcohol-polybasic acid resin is glyceryl phthalate resin, and in which the excess of said polyhydric alcohol is from 10% to 22%.

DONALD EDWARDS EDGAR.